Nov. 30, 1937.    L. M. WATSON ET AL    2,100,461
APPARATUS FOR CUTTING TIRE MOLDS
Filed Oct. 11, 1935    5 Sheets-Sheet 1

INVENTORS
LISLE M. WATSON
RAYMOND F. TERNES
LESTER G. BUDLONG
BY
ATTORNEY.

Nov. 30, 1937.　　　L. M. WATSON ET AL　　　2,100,461
APPARATUS FOR CUTTING TIRE MOLDS
Filed Oct. 11, 1935
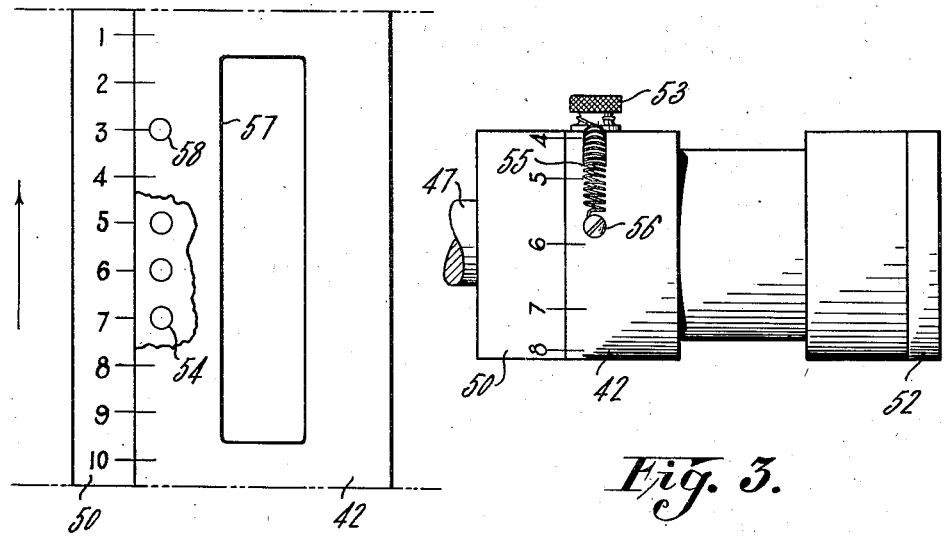
Fig. 3.
Fig. 4.
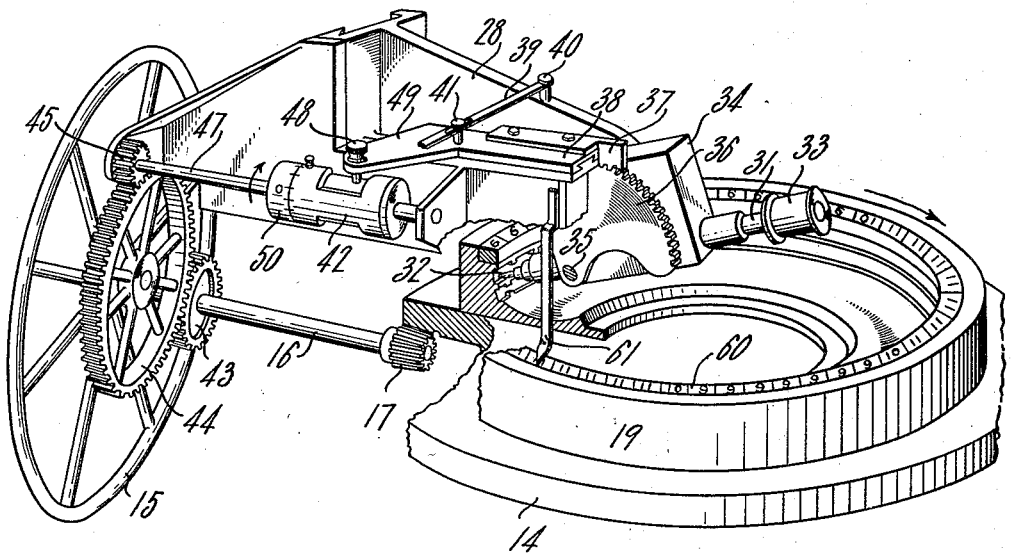
Fig. 2.
INVENTORS
LISLE M. WATSON
RAYMOND F. TERNES
LESTER G. BUDLONG
BY
ATTORNEY.

Nov. 30, 1937. L. M. WATSON ET AL 2,100,461
APPARATUS FOR CUTTING TIRE MOLDS
Filed Oct. 11, 1935 5 Sheets-Sheet 3

INVENTORS
LISLE M. WATSON
RAYMOND F. TERNES
LESTER G. BUDLONG
BY
ATTORNEY.

Nov. 30, 1937.    L. M. WATSON ET AL    2,100,461
APPARATUS FOR CUTTING TIRE MOLDS
Filed Oct. 11, 1935    5 Sheets-Sheet 4

INVENTORS
LISLE M. WATSON
RAYMOND F. TERNES
LESTER G. BUDLONG
BY
ATTORNEY.

INVENTORS
LISLE M. WATSON
RAYMOND F. TERNES
LESTER G. BUDLONG
BY
ATTORNEY.

Patented Nov. 30, 1937

2,100,461

UNITED STATES PATENT OFFICE 2,100,461

APPARATUS FOR CUTTING TIRE MOLDS

Lisle M. Watson and Raymond F. Ternes, Detroit, Mich., and Lester G. Budlong, Mount Vernon, N. Y., assignors to United States Rubber Products, Inc., New York, N. Y., a corporation of Delaware Application October 11, 1935, Serial No. 44,552

9 Claims. (Cl. 90—15)

Our invention relates to apparatus for cutting tire molds. More particularly it relates to an adjustable stop ring and associated mechanism for successively cutting irregular length units of tread configuration in a mold.

Recent developments in the manufacture of pneumatic tires have resulted in the adoption of tread configuration, wherein individual tread elements or non-skid units are made in variable length in order to break up sound producing vibrations while the tire is in operation. For example, a tread may be divided into units of tread elements having variable lengths such as 9, 10, and 11. These various lengths may be grouped to form various combinations throughout the circumference of the tread.

A prior method of cutting a mold having such a tread configuration consisted of cutting all of the tread units which were of equal length; as, for example, tread units 9. After these units were cut, a different gear ratio was used in order to produce a longer tread unit such as 10. Then the tread units of length 11 were cut.

A machine operation of this kind has various objections. It is neither accurate nor efficient requiring changes during the machine operation, when results in much loss of time in a mold cutting operation. It is, therefore, an object of this invention to provide an expeditious and economical apparatus for cutting or engraving variable pitch tread units.

A further object is to provide means for consecutively cutting tread configurations in a mold wherein the tread elements are of different unit lengths.

These and other objects and advantages will appear more fully in the following detailed description when considered in connection with the accompanying drawings, in which:—

Fig. 2 is a perspective view, partly in section, of a portion of the apparatus looking from a different angle;

Fig. 3 is a side elevational view of a mold engraving stop ring;

Fig. 4 is a developed view thereof;

Figure 6:
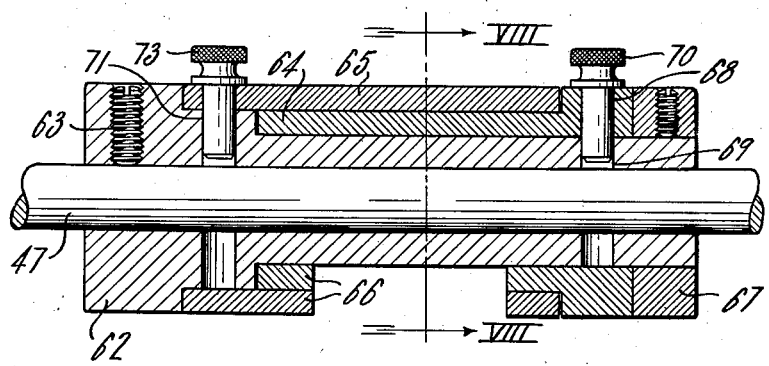
Fig. 6 is a longitudinal view, in section, of a modified form of a mold engraving stop ring.
Figure 7:
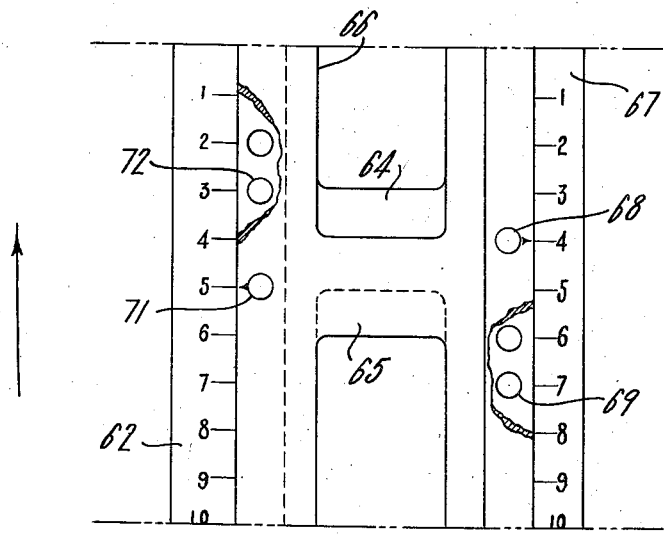
Fig. 7 is a developed view thereof.
Figure 8:
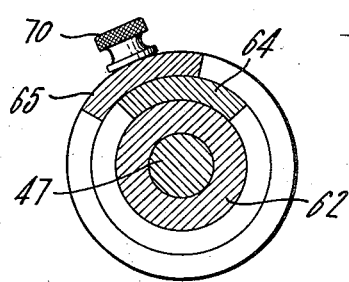
Fig. 8 is a transverse view, in section, of a modified stop ring, taken along section lines VIII—VIII of Fig. 6.

Figs. 9 to 15, inclusive, are diagrammatic views of setting rings, stop rings, and molds, illustrating their relative function; and, Figs. 16 to 19, inclusive, are similar diagrammatic views illustrating the function of the embodiments shown in Figs. 6, 7, and 8.

Figure 1:
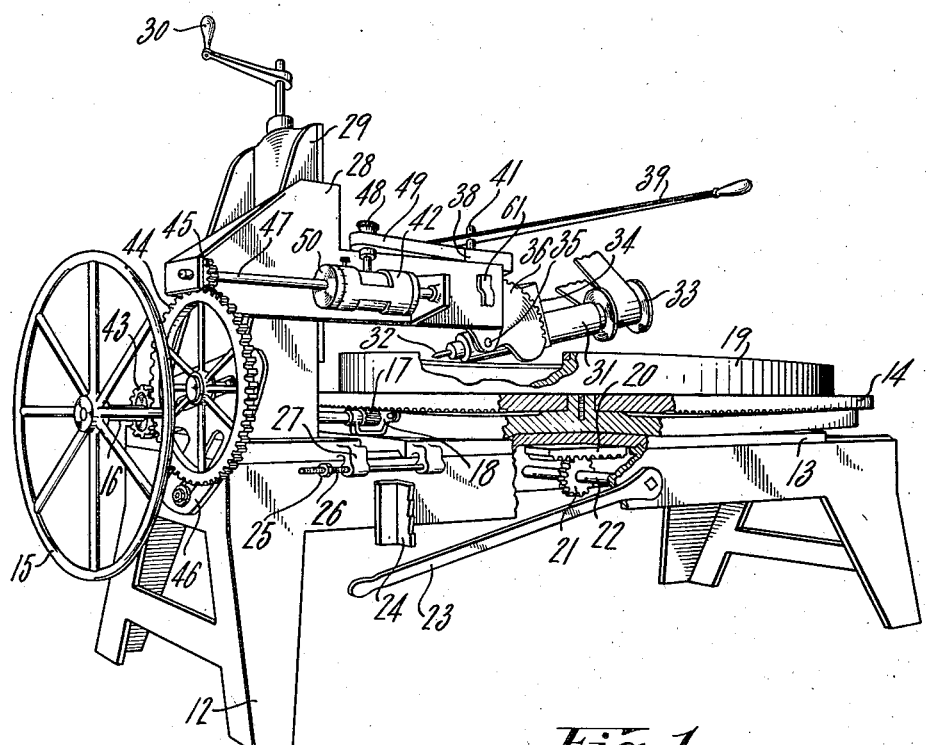
Fig. 1 is a perspective view partly in section, of a mold engraving apparatus embodying our invention.

Referring to Figs. 1 and 2, we show a mold engraving machine which for the greater part consists of conventional apparatus. A frame 12 supports a slide plate 13 on which a mold table 14 is rotatable. A hand wheel 15 mounted on a shaft 16 carries a bevel gear 17 which intermeshes with teeth on the under side of the mold table 14. A bracket 18 maintains the bevel gear 17 in proper meshing relation with the gear teeth on the under side of the mold table 14. As the mold engraving tool, hereinafter explained, is maintained in fixed relative position, means is provided for moving a mold 19 into and out of engagement with the engraving tool. This means comprises a rack 20 secured to the under side of the slide plate 13, and meshing with a gear 21 attached to a shaft 22. A hand lever 23, also attached to the shaft 22, provides means for manually adjusting the horizontal position of the mold 19. A ratchet latch 24 cooperates with the hand lever 23 for maintaining it in a fixed position. Adjustable means, as a nut 25, is secured to a rod 26 attached to the slide plate 13 and extending through a lug 27 depending from the frame 12. This limits the movement of the mold 19 relative to the engraving mechanism.

A horizontal bracket 28 extends from a vertical member 29 forming part of the frame 12, and is adjustable for vertical movement by operation of a hand lever 30 associated with conventional means such as a worm screw (not shown). The horizontal bracket 28 supports the engraving tool mechanism consisting of a pivoted shaft 31 carrying an engraving or cutter tool 32. A pulley 33 mounted on the opposite end of the shaft 31 provides means through which the cutter tool 32 is operated.

In order to move the cutter tool 32 transversely across the crown of the tire mold, the shaft 31 through its housing support 34 is pivoted to the horizontal bracket 28 at 35. A gear segment 36 secured to the housing 34 meshes with a rack 37 (Fig. 2) attached to a plate 38 slidably mounted on the horizontal bracket 28. Horizontal movement of the rack 37 and plate 38 is effected by manual operation of a hand lever 39 pivotally attached at 40 to the horizontal bracket 28 and engaging with the plate 38 at a pivot 41.

As thus described, it is evident that the cutting tool may be moved to any point in the area of the crown of the tire mold. That is, manual operation of the hand wheel 15 produces rotary movement of the tire mold 19, while manual operation of the hand lever 39 moves the working tool 32 transversely across the crown of the tire mold 19.

Means in the form of a configured or slotted stop ring 42 is provided in order to operate as a guide for limiting relative movement of the cutting tool 32, and for preventing the moving of the tool 32 outside of a predetermined pattern. In order to decrease the possibility of errors in the engraving of the tread pattern the stop ring is usually provided with a larger pattern than the actual size of the tread unit. For example, its ratio to the mold pattern is approximately 4 to 1.

The stop ring 42 is rotatable relative to rotary movement of the mold 19. This proper relation is maintained through a chain of gears 43, 44, and 45.

A bracket 46 which supports the gear 44 is adjustable in order to compensate for different heights of the horizontal bracket 28, and also for the purpose of accommodating substitute gears for providing correct relative movements between the stop ring 42 and the mold 19.

The gear 45 is mounted on a shaft 47 which also carries the stop ring 42. During the normal operation of the engraving apparatus the stop ring 42 is held in locked relation with the shaft 47, and a follower pin 48 retained in an extension 49 of the plate 38 is located over and cooperates with the configuration or slot in the ring 42. The configuration in the ring 42 forms a depressed design of which the base diameter is less than that of the stop ring proper; and the pin 48 in engaging with the smaller diameter of the configuration limits the rotary movement of the ring 42 in accordance with the pattern thereon. The stop ring, in turn, limits the horizontal movement of the pin 48, thus defining the movement of the working tool 32 relative to the mold 19.

As thus far explained, the stop ring and its associated mechanism will operate to permit the engraving of a tire mold, providing all of the tread units are of equal length. In the present invention, however, the ring 42 is particularly adaptable for permitting the engraving of a mold wherein the tread units are of variable length. This is effected principally by permitting predetermined movement of the stop ring 42 relative to the shaft 47.

Figure 5:
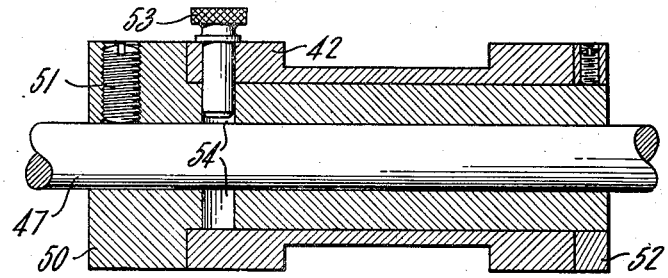
Fig. 5 is a longitudinal view, in section, of the mold engraving stop ring.

As shown in Fig. 5, the ring 42 is adjustably movable in rotary relation to a hub 50 secured to the shaft 47 by means such as a set screw 51. A collar 52 secured to the hub 50 operates to retain the ring 42 on the hub 50. A pin 53 extends through the ring 42 and engages with one of a plurality of apertures 54 in the hub 50.

In Fig. 3, a spring 55 is connected between the pin 53 and a screw 56 on the ring 42. This is merely a provision for preventing the loose pin 53 from dropping out of engagement with the ring 12 and hub 50 during rotary movement thereof.

Fig. 4 shows a development of the stop ring 42 and hub 50 and tread pattern unit 57.

In the present embodiment we show the tread unit pattern in rectangular form so as to permit the engraving of a tread of the conventional block type. However, it is to be understood that the stop ring and tread configuration may be of any other pattern such as diamond shaped units, multiple arrangements of rectangular units, or combinations of both.

As the tread units in the mold are cut, the mold is rotated progressively in the direction indicated by the arrow in Fig. 2. Corresponding to this movement, the stop ring, as shown in Fig. 4, moves progressively forward as indicated by the directional arrow.

Figs. 9 to 15, inclusive illustrate a cycle of operation wherein adjacent differential block lengths in a mold are cut in the order of 10—9—11—11 relative positions of the pin 48 and the cutting tool 32 being shown.

Figure 9:
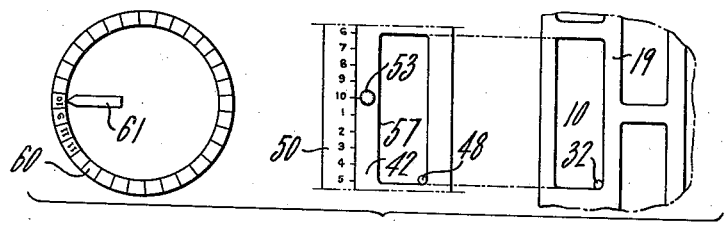

Fig. 9 illustrates the first position in the cycle of operation, showing the cutting of a number 10 block length unit in a mold. The cutting of this block 10 is determined from an index ring 60 carried by the mold 19 cooperating with a pointer 61 carried by a bracket 28 which indicates on the ring that a number 10 block unit is in order to be cut. In this case the design 57 of the stop ring 42 itself is equivalent to the block length 10. Therefore, it is only necessary to cut the complete block outline in accordance with the pattern 57 of the ring 42. The pin 53 which locks the stop ring 42 with the hub 50 may be placed adjacent any of the numerals indicated on the hub 50. However, in order to form a closer relationship, the block 10 is cut with the pin 53 located adjacent to the numeral 10 on the hub 50.

Figure 10:
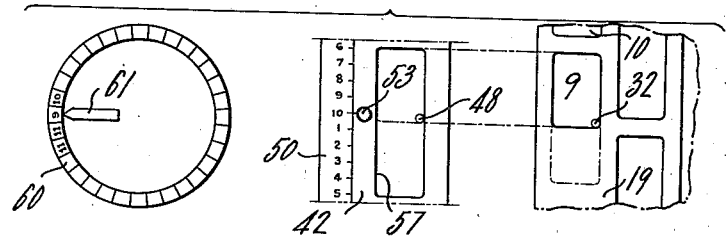

When the block 10 is completely cut the mold is rotated by the hand wheel 15 (Fig. 2) to a position for the next block cutting operation. As shown in Fig. 10, the index ring 60 indicates that the next cutting operation is a number 9 block length unit. The start of this operation is similar to the cutting of a number 10 block unit. That is, the pin 48 (Fig. 2) is lifted up and the stop ring 42 and hub 50 rotated a distance so that the block 10 will be spaced, as shown, a short distance from the subsequent block 9. This distance is determined by the diameter of the stop ring 42 and represents the circumferential distance between the ends of the stop ring pattern 57. After the ring 42 has been rotated at least such a distance, the pin 48 is dropped in a position within the outline of the stop ring pattern.

Figure 11:
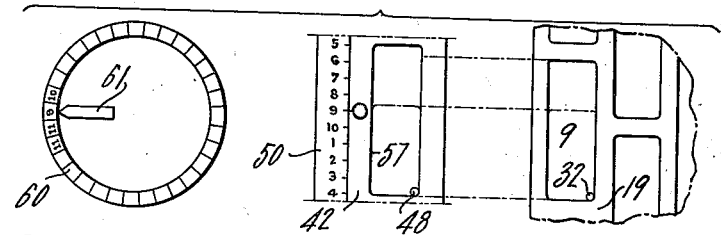
Figure 12:
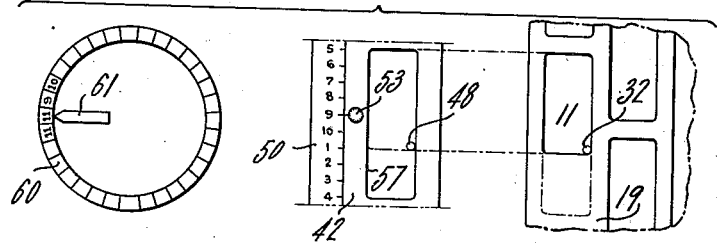

It will be noted that thus far the pin 53 has not been disturbed in relation to the hub 50. At shown in Fig. 10, the length of the pattern 57 is greater than the length of the block unit 9. Accordingly, before the stop ring 42 is changed in relation to the hub 50 any portion of the block 9 may be cut which is equal to or less than the length of block 9. However, in the practice of the invention it has been found expedient to cut the forward portion of the block for about one-half the length of the block pattern 57. At this stage of the operation, as shown in Fig. 11, pin 53 is raised and the stop ring 42 is moved ahead (upwardly as shown in the drawings), the pin 53 being replaced in registry with the numeral 9 on the hub 50. This movement of the stop ring operates to shorten the remaining uncut portion of the block unit 9 in the mold by advancing the rear edge of the pattern 57 towards the tool 32.

Figure 13:
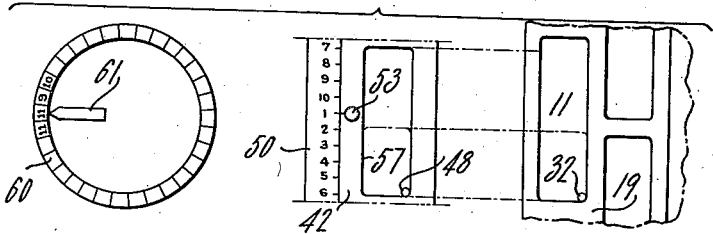
Figure 14:
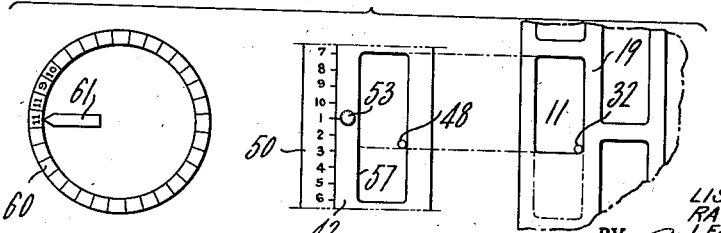

Assuming that the next block unit is of number 11 length, as shown by the index ring (Fig. 12), the pin 48 is moved over the bridge separating the ends of the pattern 57, and the first half or portion of number 11 block unit is cut. Next pin 53 is raised and the stop ring 42 is moved backward two notches and in registry with the numeral 1 on the hub 50. In this position, and as shown in Fig. 13, the remaining portion of the block length unit 11 is cut. Thus, the backward movement of the stop ring 42, after a portion of the block has been cut, permits the cutting of a block unit such as 11 longer than the total length of the pattern 57. If, as previously assumed, the next block length is also a number 11 unit, the first half or portion of the block is cut as usual, as shown in Fig. 14.

Figure 15:
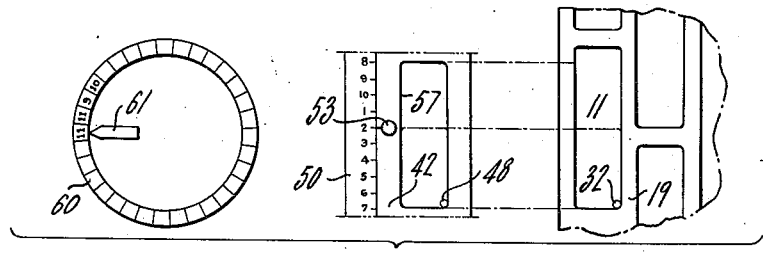

Before cutting the remaining portion of the block the pin 53 is raised, and the stop ring 42 is moved backward so that the pin is taken out of registry with the numeral 1 on the hub 50 and placed in registry with the numeral 2, as shown in Fig. 15.

From the foregoing it will be seen that the numerals 1 to 10 on the hub 50 have no particular significance relative to the exact block length of any specific unit such as 9—10—11—11, but that they serve as guides for identifying the location of the pin 53. For example, if the pin 53 is located in registry with the numeral 2 on the hub 50 for cutting a block unit 11 and it is desired to next cut a block unit 9, pattern 57 is shortened by moving the stop ring forward two notches, thus bringing the pin 53 in registry with the numeral 4 on the hub 50. In this manner consecutive tread units may be engraved in which adjacent units are of varying length, and which may be selected according to predetermined requirements. It will be noted that in this stop ring construction it is required to cut about one-half of the next adjacent tread configuration before the stop ring is adjusted in its final position. This is necessary in order to maintain a uniform distance between adjacent tread pattern units.

From the foregoing stop ring operation it will be noted in certain cases, particularly in cutting of a numeral such as a nine length tread unit, that only one part or half of the stop ring can be used at one setting. In other words, the whole outline of the stop ring could not be used to cut a numeral 9 length tread unit for the reason that the pattern 57 itself in its full length is equivalent to a 10 length tread unit. We therefore provide by way of modification a stop ring assembly capable of operating as a guide for the cutting of a complete tread unit, regardless of its length. This modification is shown in particular in Figs. 6, 7, and 8. In general, it is similar to the stop ring previously described, except that it is in the form of a double ring, each ring requiring separate adjustment.

This modified form of stop ring may be positioned on the shaft 47 (Fig. 6), and comprises a hub 62 secured to the shaft 47 by means such as a set screw 63. The stop ring itself consists of an inner sleeve 64 and an outer sleeve 65. Each of these sleeves 64 and 65 includes a substantially similar pattern 66, which in overlapping combination form but a single effective tread unit pattern cooperating with pin 48.

The principal feature of this stop ring is that the length of the effective pattern may be definitely controlled. The inner sleeve 64 is rotatable within the confines of a reduced diameter of the hub 62. A collar 67 normally retains the inner sleeve 64 in its proper relation on the hub 62. An aperture 68 through one wall of the inner sleeve 64, and a plurality of apertures 69 through the wall of the hub 62 and in spaced relation thereof around, provide means for inserting a pin 70 to lock the inner sleeve 64 in position with the hub 62. The outer sleeve 65 is rotatable about a reduced diameter formed in part by the hub 62 and in part by the inner sleeve 64. The outer sleeve 65 likewise has an aperture 71 extending through the wall thereof for cooperative alignment with a plurality of apertures 72 radially positioned and in spaced relation around the wall of the hub 62. Pins 73 inserted into the apertures 71 and into one of the apertures 72 of the hub 62 provide means for locking the outer sleeve 65 with the hub 62.

It is preferable that the tread unit patterns 66 of sleeve 64 be equal in functional length to the tread unit pattern 66 of the sleeve 65. It is also preferable that when the sleeves 64 and 65 are in superimposed direct alignment, the space between the ends of the pattern 66 should be relatively equal to the space between adjacent tread unit configurations in the finished mold. One of the essential requirements of a stop ring of this type is that the patterns 66 of the sleeves 64 and 65 must each be equal in length to the greatest length of the block desired to be cut. The end of the pin 48 rests on the surface of the hub 62 so that each of the sleeves 64 and 65 will operate to react with the pin 48, and so that the sleeves 64 and 65 in combination will form but a single effective tread pattern.

Figure 16:
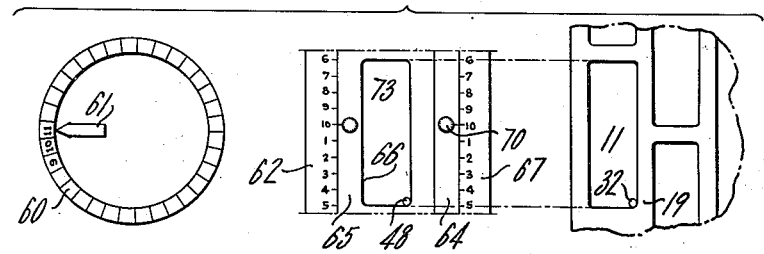
Figure 17:
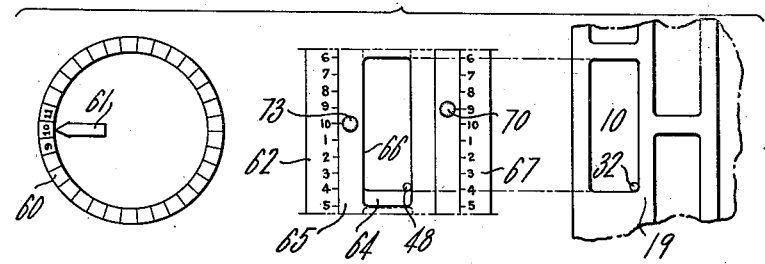

Diagrammatic illustrations shown in Figs. 16 to 19, inclusive, show a cycle of operation for cutting successive cavities in molds; for example, in the length order of 11—10—9. In this modification the longest block length is a number 11 unit. This is indicated on the index ring in Fig. 16 wherein the first block length 11 is cut with the two sleeves 64 and 65 and their patterns radially superimposed, which occurs when the pins 73 and 70 are in registry with like numerals on the hub 62 and collar 67, respectively. In Figs. 16 the pins 73 and 70 are arbitrarily shown in registry with the numerals 10 on the hub 62 and collar 67, respectively.

The next block length unit is number 10. This is shown on the index ring 60 of Fig. 17, and after the pin 48 is moved over the bridge separating the ends of the pattern 66 one of the sleeves such as sleeve 64 is moved forward to shorten the length of the effective pattern from the number 11 unit length to a number 10 unit length. This shortening of the pattern is effected by loosening the pin 70 and moving sleeve 64 forward one notch so that the pin 70 is placed in registry with the numeral 9 on the collar 67. The cavity forming the block 10 in the mold 19 may now be completely cut according to the pattern 66.

Figure 18:
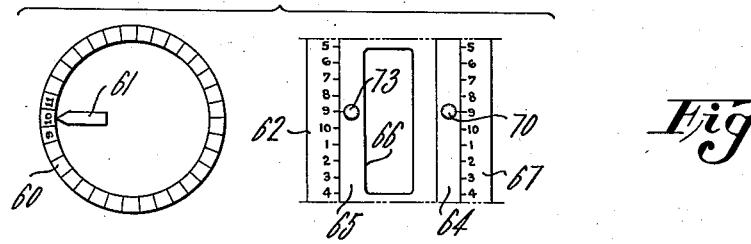
Figure 19:
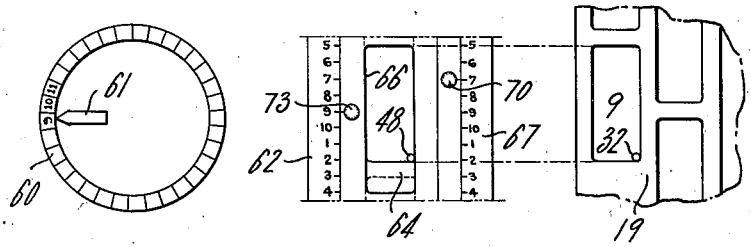

Before the next adjacent cavity in the mold is cut it is necessary to place the stop ring in a neutral position or perfectly superimposed position, as shown in Fig. 18. This is required in order to provide the correct spacing of the bridge width between adjacent cavity blocks. In the particular instance, as shown in Fig. 18, the inner sleeve 64 remains in its last fixed position while the outer sleeve 65 is advanced so that the pin 73 is in registry with a similar numeral as the pin 70. Pin 48 is next moved over the bridge separating the ends of the pattern 66, and the index ring, as shown in Fig. 19, indicates that the number 9 block unit is to be cut.

As the stop ring was previously set in the normal or greatest length block pattern, such as unit 11, it is now necessary to shorten the pattern two notches so as to form a number 9 unit length. This may be accomplished by moving the inner sleeve 64 forward two notches, thus bringing the pin 70 into registry with the numeral 7 on the collar 67.

In this modified form of stop ring any desired predetermined length of tread configuration can be obtained, and the outline of the pattern on the stop ring after adjustment will conform in all respects with the outline of the tread configuration desired to be engraved into the mold.

While we have shown and described certain present preferred embodiments of our invention, it will be readily understood that other modifications may be made therein within the spirit of the invention and the scope of the appended claims.

Having thus described our invention, what we claim and desire to protect by Letters Patent is:—

1. In a cutting machine, a material support, a cutting tool, means for causing relative movement therebetween, a stop ring, comprising a plurality of independently adjustable members collectively providing a slot, movable in synchronism with such relative movement and a follower cooperating the slot for controlling the amount of such movement.

2. Mold cutting apparatus comprising a table for supporting a mold, a cutting tool, means for causing relative movement therebetween, and means for controlling the amount of such movement comprising a stop ring having a slot the effective length of which is adjustable movable in synchronism with such relative movement, and a follower for the slot whereby successive mold cuts of different lengths may be produced by changes in the effective length of the slot.

3. Mold cutting apparatus comprising a table for supporting a mold, a cutting tool, means for causing relative movement therebetween, and means for controlling the amount of such movement comprising a stop ring having separately adjustable members collectively providing an adjustable slot movable in synchronism with such relative movement and a follower for the slot, whereby successive mold cuts of different lengths may be produced by changes in the stop ring setting.

4. In a cutting machine, a shaft, a hub fixedly mounted thereon and a stop ring comprising a plurality of independently adjustable members, each having a slot therein, disposed in superimposed relation on the hub.

5. Control means for a cutting machine comprising a stop ring having a slot the effective length of which is adjustable to control the movement of a cutting tool and a follower cooperating with the slot and the tool under control.

6. Control means for a cutting machine comprising a stop ring having separately adjustable members collectively providing an adjustable slot to control the movement of a cutting tool and a follower cooperating with the slot and the tool under control.

7. Control means for a cutting machine comprising a shaft driven in synchronism with a part of the cutting machine, an index fixedly mounted on the shaft, and a slotted stop ring encircling said shaft and adjustably secured thereto in cooperative relation to said index whereby the position of said slot on said shaft may be varied as desired.

8. Control means for a cutting machine comprising a shaft driven in synchronism with a part of the cutting machine, an index fixedly mounted on the shaft, a slotted stop ring encircling said shaft and adjustably secured thereto in cooperative relation to said index whereby the position of said slot on said shaft may be varied as desired, and a follower cooperating with the slot and the machine for controlling the latter in accordance with the motion of said stop ring.

9. Control means for a cutting machine comprising a shaft driven in synchronism with a a part of the cutting machine, an index fixedly mounted on the shaft, a pair of superimposed slotted members encircling said shaft and adjustably secured thereto in cooperative relation to said index, whereby the positions of said members relative to each other and the shaft may be adjusted to provide a resultant slot, and a follower cooperating with the slot and the machine for controlling the latter in accordance with the motion of said cooperating slotted members.

LISLE M. WATSON.
RAYMOND F. TERNES.
LESTER G. BUDLONG.